US008046086B2

(12) United States Patent
Pettus et al.

(10) Patent No.: US 8,046,086 B2
(45) Date of Patent: Oct. 25, 2011

(54) METHODS AND SYSTEMS FOR BATCH PROCESSING AND EXECUTION IN A PROCESS SYSTEM

(75) Inventors: Nathan Pettus, Georgetown, TX (US); Will Irwin, Austin, TX (US); Kim Conner, Austin, TX (US); Mickey Nanda, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 832 days.

(21) Appl. No.: 11/748,840

(22) Filed: May 15, 2007

(65) Prior Publication Data

US 2008/0288089 A1 Nov. 20, 2008

(51) Int. Cl.
*G06F 19/00* (2011.01)
*G06F 12/00* (2006.01)
*G05B 15/02* (2006.01)
*G05B 19/42* (2006.01)

(52) U.S. Cl. ........... 700/9; 700/87; 700/99; 700/204; 700/266; 710/240; 710/241; 710/242

(58) Field of Classification Search ............ 700/9, 19, 700/20, 26, 87, 91, 104
See application file for complete search history.

(56) References Cited

U.S. PATENT DOCUMENTS

| | | | | |
|---|---|---|---|---|
| 5,197,011 | A * | 3/1993 | Biemans et al. | 700/96 |
| 6,522,934 | B1 * | 2/2003 | Irwin et al. | 700/11 |
| 6,647,315 | B1 * | 11/2003 | Sherriff et al. | 700/204 |
| 6,928,328 | B2 * | 8/2005 | Deitz et al. | 700/87 |
| 7,020,876 | B1 * | 3/2006 | Deitz et al. | 718/100 |
| 7,146,231 | B2 * | 12/2006 | Schleiss et al. | 700/83 |
| 7,506,090 | B2 * | 3/2009 | Rudnick et al. | 710/240 |
| 2004/0075689 | A1 * | 4/2004 | Schleiss et al. | 345/771 |
| 2004/0181294 | A1 * | 9/2004 | Deitz et al. | 700/19 |
| 2004/0254658 | A1 * | 12/2004 | Sherriff et al. | 700/87 |

(Continued)

FOREIGN PATENT DOCUMENTS

GB 2 395 801 6/2004

(Continued)

OTHER PUBLICATIONS

Search Report for Application No. GB0808654.8, dated Aug. 1, 2008.

(Continued)

*Primary Examiner* — Albert Decady
*Assistant Examiner* — Sunray Chang
(74) *Attorney, Agent, or Firm* — Marshall, Gerstein & Borun LLP

(57) ABSTRACT

A system and method for implementing a control process within a process control system and resolving inconsistencies during execution of the control process includes loading the logical structure of the control process, loading a plurality of instantiation objects or processes when the control process is instantiated, using the instantiation objects to instantiate a procedural element of the control process as the control process calls for the procedural element during execution, executing the procedural element as part of the control process, and deconstructing the procedural element as execution of the procedural element is completed during execution of the control process. Resolution of inconsistencies includes executing a first model of an entity in a controller, executing a second model of the entity in an execution engine, detecting a difference between the models, generating a prompt and receiving an operation instruction to continue the process or abort the process.

25 Claims, 8 Drawing Sheets

U.S. PATENT DOCUMENTS

2006/0089739 A1* 4/2006 Sherriff et al. .................. 700/99
2008/0066019 A1* 3/2008 Worek et al. .................. 715/965

FOREIGN PATENT DOCUMENTS

| GB | 2 396 026 | 6/2004 |
| GB | 2 398 659 | 8/2004 |
| GB | 2 417 574 | 3/2006 |

OTHER PUBLICATIONS

Examination Report in Application No. GB0808654.8 dated May 9, 2011.

* cited by examiner

METHODS AND SYSTEMS FOR BATCH PROCESSING AND EXECUTION IN A PROCESS SYSTEM

FIELD OF THE TECHNOLOGY

The present disclosure relates generally to process control systems within process plants and, more particularly, to executing a process, such as a batch process, and consistencies during a run of the process.

BACKGROUND

Factories and other production plants are commonly used to create a variety of products. Process control systems, such as those provided by Emerson Process Management, LLP, of Austin, Tex., are widely used in such factories and/or plants in which products are manufactured or processes are controlled (e.g., chemical manufacturing, power plant control, etc.). Process control systems are also used in the harvesting of natural resources such as, for example, oil and gas drilling and handling processes, etc. Virtually any manufacturing process, resource harvesting process, etc. can be automated through the application of one or more process control systems.

Process control networks, such as those used in chemical, petroleum or other processes, generally include a centralized process controller communicatively coupled to one or more field devices which may be, for example, valve positioners, switches, sensors (such as temperature, pressure and flow rate sensors), etc. These field devices may preform physical control functions within the process (such as opening or closing a valve), may take measurements within the process for use in controlling the operation of the process or may perform any other desired function within the process. Process controllers have historically been connected to field devices via one or more analog signal lines or buses which may carry, for example, 4-20 milliampere (mA) signals to and from the field devices. More recently however, the process control industry has developed a number of standard, open, digital or combined digital and analog communication protocols such as the FOUNDATION™ FIELDBUS (hereafter "Fieldbus"), HART®, PROFIBUS®, WORLDFIP®, Device-Net® and CAN protocols which can be used to implement communications between a controller and field devices. Generally speaking, the process controller receives signals indicative of measurements made by one or more field devices and/or other information pertaining to the field devices, uses this information to implement a typically complex control routine and generates control signals which are sent via the signal lines or buses to the field devices to thereby control the operation of the process.

Another common manufacturing process controlled by process control systems is a batch process. Batch processing typically involves recipes for creating materials. For example, batch processing is commonly used in the pharmaceutical and chemical industries to manufacture drugs, chemicals and other substances. The recipe describing a batch process typically indicates how to make the desired substance. For example, a particular chemical may be created by first mixing two chemicals and then heating the mixture. The total recipe may contain hundreds of steps for creating just one substance. The recipe may indicate what materials to use and in what proportions, whether to heat or cool the materials and what equipment is needed to produce the desired substance. Preparation of polyvinyl chloride is an example practiced on an industrial scale. Polyvinyl chloride is made by polymerizing or "joining together" much smaller molecules of vinyl chloride. This is accomplished by filling a batch reactor to the appropriate level with a mixture of vinyl chloride, solvent and polymerization inducer, heating the mixture in the reactor, cooling the resulting batch, and purifying the batch by removing leftover starting materials.

Certain types of process control networks, such as those used in batch processes, typically include multiple sets of replicated equipment designed to have the same or similar equipment that performs essentially the same function within the processes. Thus, for example, a manufacturing plant for polyvinyl chloride may have multiple sets of reactor equipment (i.e., reactors), multiple sets of heating equipment (i.e., heaters), multiple sets of cooling equipment (i.e., coolers, multiple sets of purifying equipment (i.e., purifiers) and multiple sets of packaging equipment (i.e., packaging units), with some or all of the reactors being capable of operating in parallel and of being connected to operate in series with some or all of the heating, cooling, purifying and packaging units.

Typically, a batch process performs a number of different phases or steps in sequence, finishing the first stage before beginning the second stage. Thus, in the manufacturing plant described above, the batch process may run a first phase or step to control the reactor unit, may then run a second phase to run the heating unit on the product made by the reactor equipment, run a third phase that controls the cooling unit to cool the product produced by the heating unit, run a fourth phase that controls the purifying unit to purify the product and run a fifth phase that controls the packaging unit to package the purified product. Typically, each unit has an associated unit module object, which may be software adapted to represent the state of a unit (e.g., a hardware component). Unit module objects may be algorithms embodied in software instructions that are optimized to coordinate the execution of lower level modules (hereinafter the lower level modules will be referred to simply as "module objects"). Module objects, as described in further detail hereinafter, may include a variable portion and an algorithm portion. Typically, a module object is designed to carry out a single logical function such as, for example, opening a valve or filling a tank. In short module objects are used to change the state of a hardware component.

Although the foregoing exemplary hatch process for making polyvinyl chloride indicates that each phase operates on one particular unit, this is not necessarily always the case. Depending on the number of steps of each phase, multiple units of equipment may be used to carry out a particular phase. For example, if instead of a batch process being written and used for making polyvinyl chloride, making polyvinyl chloride may be a single phase of a larger batch process, such a phase could the reactors, heaters, coolers, purifiers and packaging units.

Generally, it is important to control a batch process. For example, if a reaction mixture of vinyl chloride is not reacted long enough, the yield of polyvinyl chloride from the process will be inadequate and money will be lost. Control of a batch process can become critical where production of dangerous chemicals or comparable entities is involved. One way to control a batch process is manually. That is, one or more workers are assigned the job of watching all aspects of batch process to be sure that everything is proceeding according to plan. However, this is tedious work, and errors can creep in unnoticed. For these and other reasons, automation has been developed to control batch processes by using electronic devices. Computers, programmable controllers and comparable electronic devices have been used in conjunction with intelligent field devices (i.e., intelligent sensors and controllable valves) by a number of batch control system suppliers to automate the control of batch processes. An intelligent sensor is typically placed on a piece of equipment and reports on equipment conditions to a central control room in the plant. A controllable valve typically controls the input to, or output from, a piece of equipment, and can be controlled from a central control room, often based on information received from an intelligent sensor.

Efforts to automate batch processing have led to the formation of standards committees by members of industries involved in batch processing and suppliers of batch processing equipment, among others. The general purpose of these standards committees has been to define uniform standards for automated batch processing. One such standard has been promulgated by the International Society for Measurement and Control, an international organization concerned with issues of process control. This standard is entitled Batch Control Part 1: Models and Terminology and is often referred to as the ISA S88.01-1995 standard (or "S88" for purposes of this application). The S88.01 standard defines models of equipments and procedures for use in automated batch processes, as well as terminology for use in referring to those models and their elements. The S88.01 standard references a "batch process" as a process that leads to the production of finite quantities of material by subjecting quantities of input materials to an ordered set of processing activities over a finite period of time using one or more pieces of equipment. A "batch" is the material that is being produced or has been produced by a single execution of a batch process.

The control recipes to operate the physical elements within a batch process are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. The levels of a procedural model are, in descending order, the "procedure", the "unit procedure", the "operation" and the "phase", where a "procedural element" refers to any of the levels within the control recipe or procedural model. In the hierarchy, the highest-level procedural element is referred to as a procedure, which is made up of one or more unit procedures. Each unit procedure is in turn made up of one or more operations, which are each in turn made up of one or more phases.

Batch execution environments have become increasingly complex, particularly with the advent of S88.01 standard. This complexity typically manifests itself in larger and larger control recipes, each with a seemingly ever greater number of procedural elements. At the same time, batch processing plants are also growing in size and capacity. For example, the batch processing plants are capable of running multiple product "trains" simultaneously, thereby requiring the ability for the control system to manage many parallel batches at the same time. However, the increased complexity and size of the recipes combined with the improved flexibility of the actual plant equipment strains the batch processing control system. Loading and running many batches based on large and complex recipes utilizes processing, memory and other resources to their limits.

For example, a batch execution engine loads the control recipe into a process memory, and begins executing the procedural element of the control recipe in the preconfigured order. The entire procedural structure is loaded at creation time, including all levels of the control recipe, regardless of whether the various procedural elements will ever actually be executed or not. As such, it is entirely possible that depending on a choice between executing two different procedures, the unselected procedure (including some or all of the associated procedural units, operation and phases) may never actually be required. Unfortunately, the choice of which procedure to actually execute is not typically known until runtime of the control recipe, which is well past the time when all the procedural elements were loaded at creation time. As a result, even though some of the procedural elements may or may not be required during the actual execution, they are loaded regardless, and the procedural elements consume large amounts of memory, processor time, and other resources. Eventually, these strains effect a limit on the number of batches that a plant can typically load in the batch execution engines.

The complexity of batch execution environments have become increasingly complex further manifests itself in ever larger plant configurations, which have to be maintained and updated periodically. In typical systems, there are two components utilized during the execution of a batch: a lower-level controller responsible for actuating valves, pumps and other devices, and a higher-level batch execution engine, which arbitrates, monitors, and coordinates the lower-level controllers. Both of these components utilize an up-to-date model of the actual plant, such as the procedure models discussed above, and associated logic needed to control the plant equipment while running a particular batch. Plant engineers and supervisors may want to reconfigure part of the plant equipment to accommodate the manufacture of a new product, increase efficiency, etc. This reconfiguration may include changes in control recipes or equipment models such that they match the new configuration. When this occurs the controller and batch execution engine should be updated so that they know of the changes and can implement the new changes. Unfortunately, for any number of reasons, inconsistencies between these two components has typically required the entire batch to be held or aborted, thereby leading to loss production time or, even lost product. However, it is entirely possible that the inconsistency is benign or may be overcome using an older model or model parameter.

SUMMARY

A system and method of implementing a control recipe and for resolving inconsistencies during execution of the control recipe are provided. In particular, the control recipe is implemented using a technique that optimizes the amount of time and memory required to load and execute even the most complex control recipes, and increasing the number of concurrent batches that can be processed concurrently. The technique involves instantiating and loading the procedural elements of a recipe "just-in-time" and only when utilized during runtime of the control recipe, rather than at creation time of the control recipe.

The system and method for the "just-in-time" processing utilizes instantiation objects or procedures which are implemented as part of the control recipe, or called upon by the control recipe. Each of the procedural elements that may be called during runtime of the control recipe are associated with an instantiation object. For example, at batch creation time, the procedural elements may be loaded into the associated instantiation object. In particular, the logical structure of the procedural elements may be loaded into the instantiation object, where the logical structure does not include the various parameters used by the procedural element to control an aspect of the process. In another example, the logical structure of the procedural elements are created within the instantiation object as the procedural element is used. During runtime, the instantiation objects are used to instantiate a procedural element as it is needed by the control recipe. Once the procedural element is executed as part of the control recipe, the instantiation object is used to deconstruct the procedural element from the control recipe. The resources that were used by the procedural element may thereby be reclaimed for further use in executing the control recipe.

In another aspect, the same instantiation objects may be used for multiple procedural elements. For example, multiple procedural elements utilizing the same logical structure may use the same instantiation object. The instantiation object loads or creates the logical structure and populates the logical structure with the parameters used by a particular procedure. As a result, fewer procedural elements are loaded at creation time, which may result in decreased resource usage.

Further, a technique to detect and resolve inconsistencies that occur during execution of the control recipe allows for the option of ignoring the inconsistency or aborting (holding) then batch process to correct the inconsistency. In particular, the technique resolves inconsistencies in models used a higher-level executive engine and a lower-level controller. Information about the inconsistency may be provided, and the batch execution engine or batch operator may decide whether to continue or abort the batch process based on the information about the inconsistency. In one example, the batch process may be allowed to continue using a default parameter, a global parameter for all controllers to use, a previously used parameter, etc.

DETAILED DESCRIPTION

Process control systems are often used in a variety of industries to control and monitor the operation of various devices at an industrial plant. One type of industrial plant that uses process control systems are pharmaceutical manufacturing facilities. Pharmaceutical manufacturing facilities use batch processing techniques to generate large quantities of a particular substance, such as a drug, through a step-by-step process. In contrast to continuous processing techniques, such as those used for controlling the flow of natural gas through a refinery, batch processing techniques involve a series of discrete, ordered steps, such as a recipe specifying separate steps for creating a product. For example, in a batch processing environment, a final or desired product is typically created using a series of steps known as a control recipe. Each step may require the use of one or more pieces of equipment, such as heaters, conveyer belts, tanks, mixers, etc.

A particular plant may also have multiple recipes running substantially in parallel. Typically, the manufacturing plants are logically separated into distinct groups of equipment so as to avoid overloading the processing capabilities of the batch control system. Each group would include certain equipment and often would be designated for certain operations. Each control recipe generally contains all of the information (e.g., procedural structure, recipe parameters, equipment required, etc.) control various groups of the process, including different process areas, units, loops, or equipment, to manufacture a particular product. For example, one recipe may require the use of a mixing, vat while another recipe involves heating in a storage container. These control recipes are instantiated into running "batches" and progress by a batch executive or equivalent subsystem. The actual instantiation of a control recipe to a running batch typically involves loading the control recipe into the batch executive's process, for example by loading the recipe into the memory resources used by the batch executive and the batch executive executes the control recipe using processor and other computer resources, including various hardware and software resources.

Figure 1:
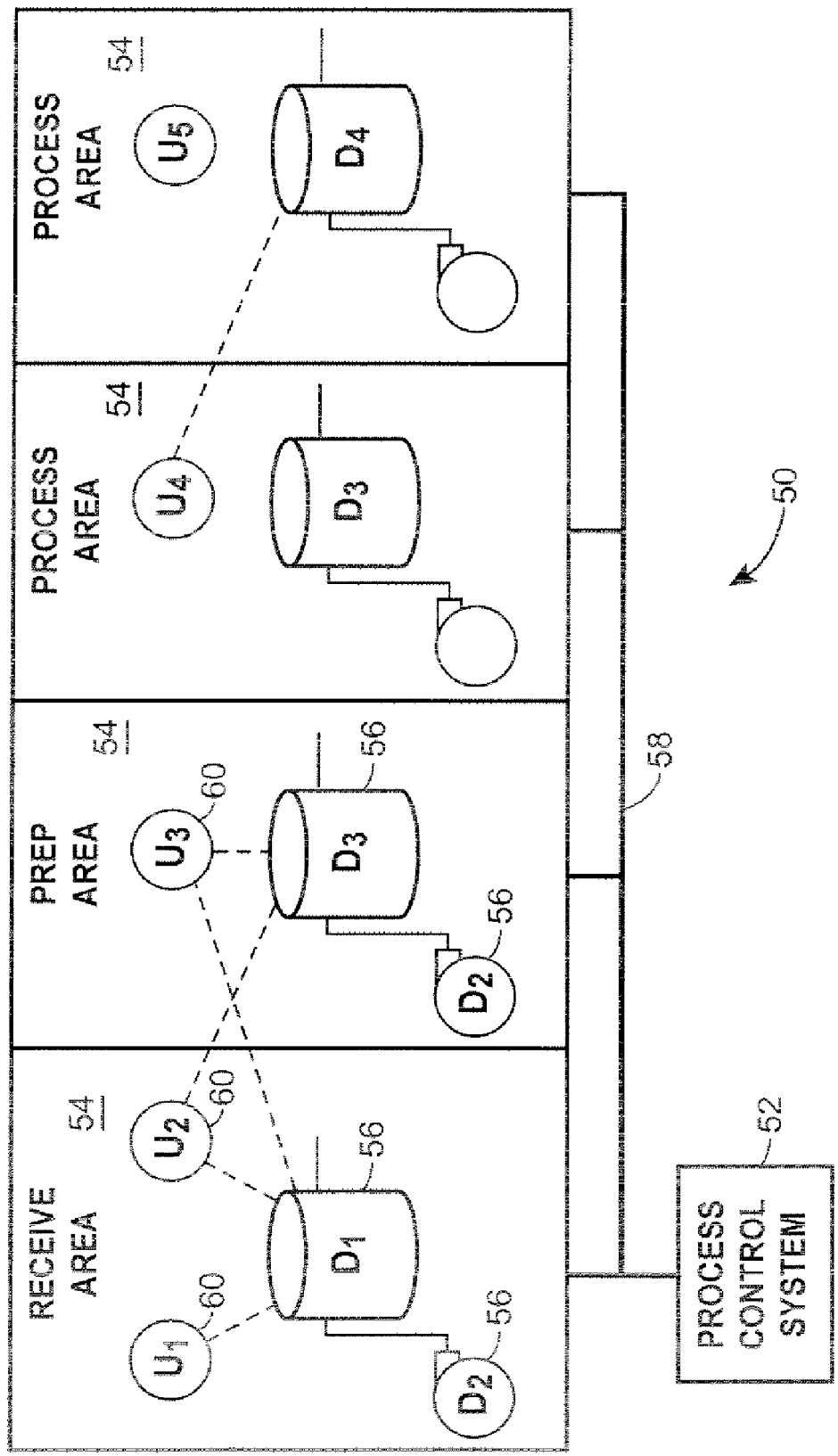
FIG. 1 is a partial block diagram, partial schematic diagram of an example of a portion of a process plant depicting a batch execution environment implemented in a batch process plant.

Referring now to FIG. 1, an example process plant 10 is illustrated in which one or more control processes, and in particular batch processes or recipes, may be implemented and executed by a batch executive. In particular, as illustrated in FIG. 1, a process plant 50 includes a process control system 52, one or more areas 54, one or more devices 56, a communications network 58 and one or more device users 60. The process plant 50 may comprise a pharmaceutical manufacturing or production facility, a refining or other chemical processing operation, or other suitable batch or continuous process environments. In the disclosed embodiment, the process plant 50 uses at least one batch processing technique, such as a batch recipe.

The process control system 52 may comprise hardware and/or software operable to control, command, monitor, test, communicate with and/or otherwise use the devices 56 over communications network 58. For example, the process control system 52 may be the DeltaV™ system sold by Emerson Process Management, LLP, of Austin, Tex. In general, the process control system 52 controls access to the devices 56 and schedules use of the devices 56 by device users 60. The communications network 58 supports data communication between the process control system 52, areas 54, devices 56 and device users 60, and may be implemented using, either alone or in various combinations, any desired bus-based and/or non-bus based hardware, using any desired hardwired and, or wireless communication structure or other suitable communication protocol, such as the Ethernet, Foundation Fieldbus or Profibus protocols.

The areas 54 represent a logical and/or physical organization of the process plant 50, the devices 56 and the device users 60. The areas 54 are generally used to organize devices 56 used in performing the steps of the recipes used in the plant 50. The organization of the areas 54 may be based on the physical location of the devices 56 in the plant 50, a logical organization of the devices 56 in the plant 50, or a combination of the physical and logical organization of the devices 56 as suitable. For example, a batch processing operation may be broken up into separate areas 54 for receiving, preparation, processing and shipping. Continuing the previous example, raw materials for a pharmaceutical creation process may be received in a receiving area, changed in a preparation area, combined and processed to create the target pharmaceutical in a process area, with the target pharmaceutical then being packaged and shipped from a shipping area. The devices 56 in the areas 54 may be used as part of the production of different types of end products, such as various equipment used to create different pharmaceuticals. In one embodiment, the areas 54 also provide a practical solution to the problem of having too many devices 56 and device users 60 for system 52 to handle as a single group. The areas 54 may be used to split up the processing of large recipes so that the process control system 52 is not slowed by being required to manage a large number of devices 56 while performing other process monitoring duties.

The devices 56 may respectively comprise a valve, tank, pump, conveyer belt, mixer, heater, or other suitable device usable as part of the processes performed in plant 50. The devices 56 may, at various times, be used in different portions of the batch process by different device users 60. For example, a particular heater device 56 may be used with a first substance for one end product, cleaned, and then later used with a second substance for a different end product.

The device users 60 represent physical or logical entities that use the devices 56. For example, a user 60 may represent a particular recipe being executed by the process control system 52 that uses the devices 56 in a particular order to produce a particular product. The device users 60 may themselves be devices 56. For example, a pump device may act as a device user when requesting access to a tank device so that the pump device can fill the tank device with a particular material. Further, the device user 60 may represent materials used as part of the production process itself, such as raw materials. For example, a first substance currently being stored in a tank may request access to a pump to move the first substance to a heater as part of a recipe. Also, a device user 60 may be a human or other entity not directly controlled by the process control system 52, but that may request access to the devices 56 from the process control system 52. In general, the device user 60 may be human, material, hardware, software and/or other device 56 used by the plant 50 to produce products under the control of the process control system 52.

In operation, one or more human users (not shown) may configure, control and monitor the execution of one or more recipes, batch processes or other processes using the process control system 52. The recipes are performed using the devices 56 available at the process plant 50 to generate one or more desired end-products. The process control system 52 is responsible for controlling access to devices 56 by device users (60 so that two users 60 do not attempt to use the same device 56 simultaneously.

Figure 2:
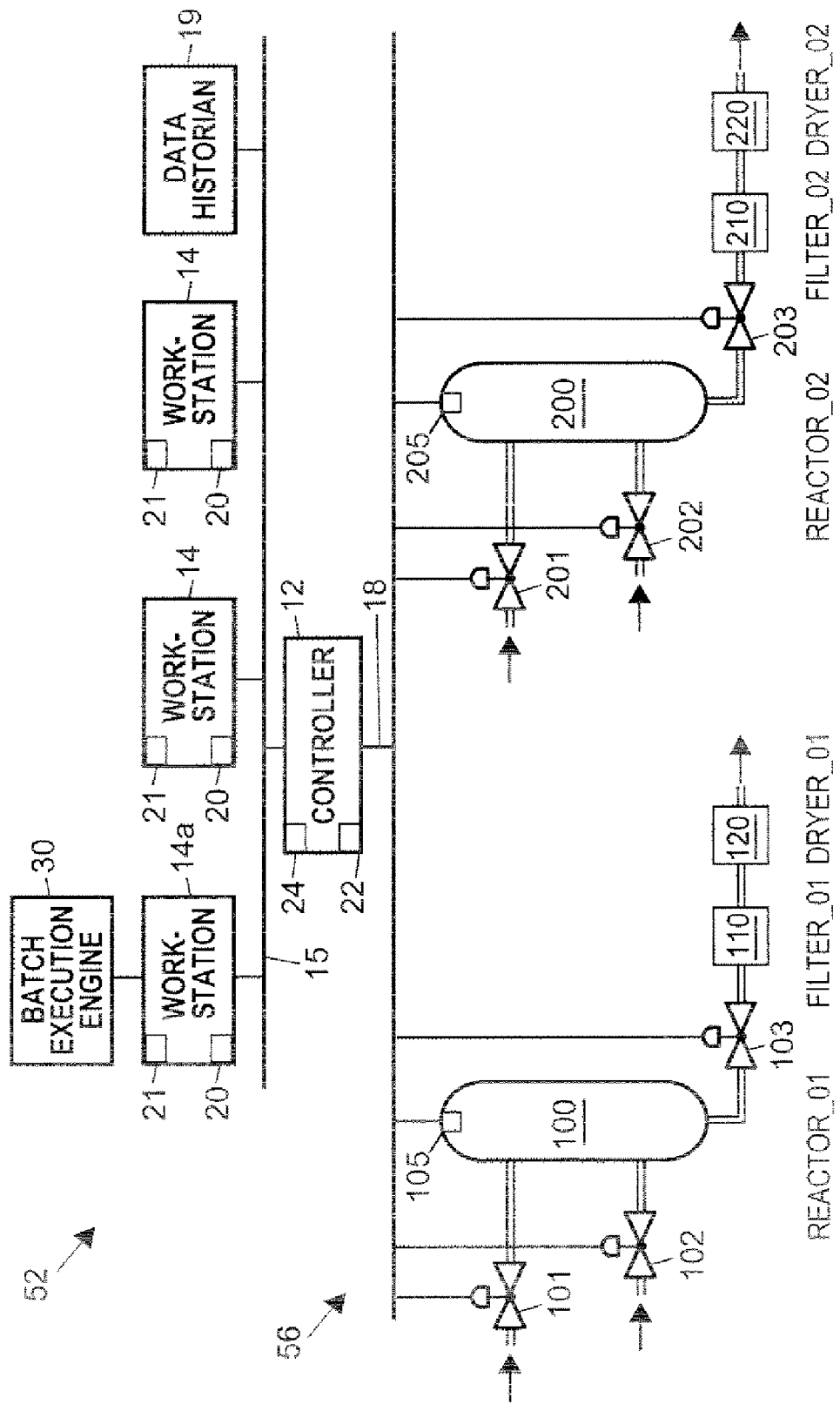
FIG. 2 is a partial block diagram, partial schematic diagram of an example of a portion of a process control system of FIG. 1 and a portion of a batch process.

FIG. 2 is a more derailed diagram of the process control system 52 interacting with an area 54. Generally, a process controller 12 is coupled to numerous workstations 14 via, for example a local area network (LAN) 15, which may in one example be an Ethernet communications connection. The controller 12 is also coupled to devices or equipment within a process plant (generally designated by the reference numeral 56) via one or more input/output (I/O) devices (not shown) and a set of communication lines and/or a bus 18. The controller 12, which may be by way of example only, the DeltaV™ Batch controller sold by Emerson Process Management, is capable of communicating with control elements, such as field devices and function blocks within field devices distributed throughout the process plant 50 to perform one or more process control routines to thereby implement desired control of the process plant 50. These process control routines may be continuous process control routines but will be described herein as batch process control routines or procedures. The workstations 14 (which may be, for example, personal computers, servers, etc.) may be used by one or more engineers or operators or other users to design and execute one or more process control routines to be executed by the controller 12, to communicate with the controller 12 so as to download such process control routines, to receive and display in formation pertaining to the process plant 50 during operation of the process plant 50 and to otherwise interact with the process control routines executed by, for example, the controller 12. Additionally, a data historian 19 may be connected to the LAN 15 and may automatically collect and store data generated within the plant 50, including within the controller 12, the filed devices and even the workstations 14, in any known or desired manner.

Each of the workstations 14 includes a memory 20 for storing applications, such as configuration design applications, and for storing data, such as configuration data pertaining to the configuration of the process plant 50. Each of the workstations 14 also includes a processor 21 that executes one or more applications which may, among other things, enable a user to design process control routines such as batch control routines and to download those process control routines to the controller 12. Likewise, the controller 12 includes a memory 22 for storing configuration data and process control routines to be used to control the process plant 50 and includes a processor 24 that executes the process control routines to implement a process control strategy. If the controller 12 is a DeltaV™ Batch controller, it, in conjunction with one or more applications on one of the workstations 14, may provide a graphical depiction of the process control routines within the controller 12 to a user illustrating the control elements within the process control routine and the manner in which these control elements are configured to provide control of the process plant 50.

In the example illustrated in FIG. 2, the controller 12 is communicatively connected via the bus 18 to two sets of similarly configured equipment, each set of equipment having a reactor unit referred to herein as Reactor_01 or Reactor_02, a filter unit referred to herein as Filter_01 or Filter_02 and a dryer unit referred to herein as Dryer_01 or Dryer_02. Reactor_01 includes a reactor vessel 100, two input valves 101 and 102 connected so as to control fluid inlet lines providing fluid from, for example, a headtank (not shown) into the reactor vessel 100 and an output valve 103 connected so as to control fluid flow out of the reactor vessel 100 via an outlet fluid line. A device 105, which can be a sensor, such as a temperature sensors a pressure sensors a fluid level meter etc. or some other equipment such as an electrical heater or a steam heater, is disposed in or near the reactor vessel 100. The Reactor_01 is coupled via the valve 103 to the Filter_01 having filter equipment 110 which, in turn is coupled to the Dryer_01 having dryer equipment 120. Similarly, the second set of equipment includes the Reactor_02 which has a reactor vessel 200, two input valves 201 and 202, an output valve 203 and a device 205. The Reactor_02 is coupled to the Filter_02 having filter equipment 210 which, in turn, is coupled to the Dryer_02 which has dryer equipment 220. The filter equipment 110 and 210 and the dryer equipment 120 and 220 may have additional control elements (such as heaters, conveyor belts and the like), sensors, etc. associated therewith. If desired, although not shown, each of the filter units Filter_01 and Filter_02 may be physically coupled to each of the reactor units Reactor_01 and Reactor_02 while each of the dryer units Dryer_01 and Dryer_02 may be coupled to each of the filter units Filter_01 and Filter_02 so that a batch run using one of each of a reactor, a filter and a dryer may use any combination of the equipment illustrated in FIG. 2.

As illustrated in FIG. 2, the controller 12 is communicatively coupled to the valves 101 103, 201 203, to the devices 105, 205, to the filters 110, 210 and to the dryers 120 and 220 (and to the other equipment associated therewith) via the bus 18 to control the operation of these elements (which may be units, field devices, etc.) to perform one or more operations with respect to these elements. Such operations may include, for example, filling the reactor vessels, or dryers, heating the material within the reactor vessels or dryers, dumping the reactor vessels or dryers, cleaning the reactor vessels or dryers, operating the filters, etc. Of course, the controller 12 could be coupled to the elements within the process plant 50 via additional busses, via dedicated communication lines, such as 4-20 mA lines, HART communication lines, etc.

The valves, sensors and other equipment illustrated in FIG. 1 may be any desired kind or type of equipment including, for example, Fieldbus field devices, standard 4-20 mA field devices, HART field devices, etc. and may communicate with the controller 12 using any known or desired communication protocol such as the Fieldbus protocol, the HART protocol, the 4-20 mA analog, protocol, etc. Still further other types of devices may be connected to and be controlled by the controller 12 in any desired manner. Also, other controllers may be connected to the controller 12 and to the workstations 14 via, for example, the Ethernet communication line 15 to control other devices or areas associated with the process plant 50 and the operation of such additional controllers may be coordinated with the operation of the controller 12 illustrated in FIG. 2 in any desired or known manner.

Generally speaking, the process control system of FIG. 2 may be used to implement batch processes in which, for example, one of the workstations 14 executes a batch execution application that implements and possibly coordinates different batch runs within the process plant 50 according to one or more control recipes. Such a batch execution engine 30 is illustrated as being stored in the workstation 14a of FIG. 1, it being understood that the batch execution engine 30 could be stored in and executed in other workstations 14, or in other computers communicatively connected to the bus 15 or to the bus 18 in any desired manner, including in any wireless manner. Likewise, if desired, the batch execution engine 30 may be divided into various components or be associated with various components stored in and executed in different computers or workstations within the process plant 50.

The batch execution engine 30 is generally a high level control routine, such as the above-reference control recipe and may include what is commonly referred to as a batch campaign manager that enables a user to specify a number of batch runs to be performed within the process plant and that sets up a number of different batch runs or batch processes to operate essentially independently within the process plant control network 10. The batch execution engine 30 may also include batch executive routines or applications, that implement and oversee the different batch runs specified by the campaign manager. Each such batch run directs the operation of one or more procedures, unit procedures, operations, phases and other sub-divisions of a batch, each of which are or may be sub routines or processes that operate on a single unit, such as one of the reactor units, the filter units, the dryer units, or other equipment within the process plant 16. In this example, each unit procedure (which is a part of a batch run that is generally run on one of the workstations 14) may perform a series of operations, each of which may perform one or more phases on a physical unit. For this discussion, the terms phases, operations, unit procedures and procedures may refer to those procedural elements defined by the S88 standard and thus, a phase is the lowest level action or step performed and is typically implemented or executed in one of the controllers 12, an operation is a set of phases that performs a particular function and is typically implemented or executed on one of the workstations 14 by calling a series of phases within the controller 12, and a unit procedure is a series of one or more operations performed and is typically implemented as a set of operation calls on one of the workstations 14. Likewise, a procedure may be a set of unit procedures which are implemented as steps within the control recipe and may be performed on, for example, different physical devices or equipment within the process plant 50. As a result, any procedure can include one or more unit procedures, and any unit procedure can include one or more phases and/or one or more operations. In this manner, each batch process performs different steps or stages (e.g., unit procedures) needed to produce a product, such as a food product, a drug, etc. The term "procedural element" is used herein to refer to any embodiment or implementation of any of these levels of a procedural model, not just to those the "procedure" level or any other single level of the procedural model.

To implement different procedures, unit procedures, operations (and phases for an individual batch, the control recipe specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch, running a filter to filter the output of a reactor and then running a dryer to dry the product created in the reactor vessel. Each of the series of steps associated with a different unit defines a unit procedure of the batch and the control recipe will execute a different control algorithm for each one of these unit procedures. Of course, the specific materials, amounts of materials, heating temperatures and times, etc. may be different for different recipes and, consequently, these parameters may change from batch run to batch run depending on the product being manufactured or produced and the recipe being used.

As will be understood by those skilled in the art, the same phases, operations, unit procedures and procedures of a generic batch process can be implemented on each of the different reactor units of FIG. 2 at the same or at different times as part of different actual batch processes or batch runs. Furthermore, because the reactor units of FIG. 2 generally include the same number of and types of equipment (i.e., they belong to the same unit class), the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more of the input valves 101 or 102 for a certain amount of time, for example, until the fluid level meter 105 senses that the vessel 100 is full. However, this same control routine may be used to implement a fill phase for Reactor_02 by merely changing the designation of the input valve(s) to be the valves 201 or 202 instead of the valves 101 or 102 and by changing the designation of the fluid level meter to be the fluid level meter 205 instead of the fluid level meter 105.

Figure 3:
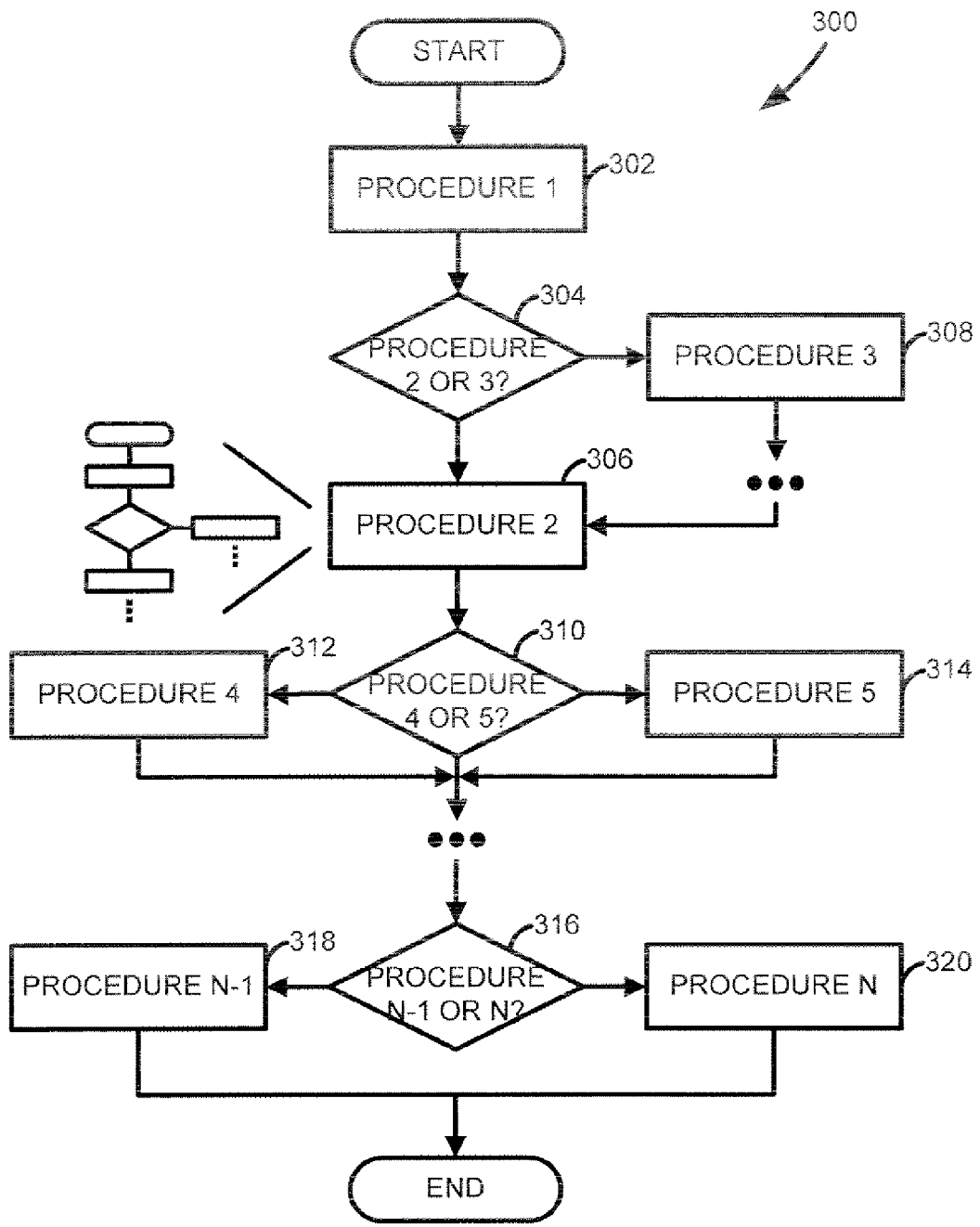
FIG. 3 is a flowchart of an example of an execution of a control recipe including execution of various procedural elements in a batch execution environment.

FIG. 3 illustrates an example of an execution of a control recipe 300 which may be implemented in, and executed by, the batch execution engine 30. Although the following example is described in reference to procedural elements as they may relate to control of equipment or devices within an area, it should be understood that the procedural elements may relate to a higher level in the hierarchy of process, for example procedural elements relating to different areas within the process, or to a lower level in the hierarchy of the process, for example procedural elements relating to different units, different loops, different equipment, etc. Likewise, implementation of a procedural element in a control recipe refers to various levels in the hierarchy of the control recipe, including any procedure, unit procedure, operation or phase. Accordingly, it should be understood that the execution the control recipe may relate to a high level execution of one or a plurality of batch processes, or may relate to a lower level execution of a process during a batch run. As such, the control recipe execution 300 and the techniques described herein for implementing the control recipe may be applied to any level of execution within a batch process.

As illustrated in FIG. 3, the control recipe includes a hierarchy of procedural elements or steps, as discussed above. Each procedural element or step is configured to execute in a particular order according to the control recipe, and execution of the control recipe may include several decision trees between two or more procedural elements. The choice of procedural element at each decision may be dependent on a variety of factors, including the state of the process, parameters returned from the process, the results of previous procedural elements within the control recipe or any of a variety of factors relating to the batch run. Accordingly, a decision to utilize one procedural element and not another results in execution of the selected procedural element and the unselected procedural element(s) are not executed, though the unselected procedural element(s) may be executed elsewhere during the execution of the control recipe. However, it remains possible that the unselected procedural elements will never be executed during the batch run.

In particular, referring to FIG. 3, execution of the control recipe begins with execution of a first procedural element at block 302 followed by a decision at block 304 to execute a second procedural element at block 306 or execute a third procedural element at block 308. The decision a block 304 may be dependent upon the outcome resulting from the first procedural element at block 302. For example, if the first procedural element at block 302 was to fill the reactor vessel reactor_01 100 and execute a reaction, the decision at block 304 may be based on determining whether the reaction was complete based on a measurement from the sensor 105. If the reaction was fully completed, the control recipe may proceed to the second procedural element at block 306 to open the valve 103 to output the contents of the reactor 100 to the filler 110. If the reaction is not completed, the control recipe may continue or repeat the reaction using the third procedural element at block 308, and possibly subsequent procedural elements which may be depended upon subsequent decisions, with control returning to the second procedural element at block 306. Alternatively, the third procedural element at block 306 may also open the valves 103 to output the contents of the reactor 100 to the filter 110, but the third procedural element relates to a different manner in which the batch process is executed as compared to execution of the batch process if the second procedural element is chosen.

As such, the control recipe may involve the potential execution of any number of procedural elements (Procedures 1-N) 302, 304, 308, 312, 314, 318, 320, not all of which may be executed during execution of the control recipe, depending on decisions 306, 310, 316 made during execution of the control recipe. Any one of Procedures 3, 4, 5 . . . N is illustrated in FIG. 3 may not be executed during execution of the control recipe. For examples the procedural element represented by Procedure 3 at block 308 may, in fact, never actually be required depending on the choice made at the "OR" decision point at block 304 within the control recipe. On the other hand, some procedural elements may necessarily be executed during execution of the control recipe (e.g. Procedures 1 and 2).

As also indicated in FIG. 3, the execution of procedural elements during execution of the control recipe (e.g., Procedure 2) may further include execution of one or more sub-procedural elements arranged in a hierarchical structure of procedural steps. For example, if the second procedural element at block 306 involves an operations for opening the valve 103 and outputting the contents of the reactor 100 to the filter 110, a sub-procedural element may be a phase instantiated to control the opening of the self with another sub procedural element (e.g., phase) instantiated to operate the filter 110. As with execution of the control recipe, execution of a procedural element may involve one or more decisions. Accordingly, while some sub-procedural elements may necessarily be executed as part of execution of the procedural element, other sub-procedural elements may never be executed during execution of the procedural element. Still further, sub-procedural elements within a procedural element may include further sub-procedural elements, and so on. For example, as discussed above, a control recipe may include several procedures, each of which may include unit procedures, unit procedures may include operations, and operations may include phases. As such, the control recipe shown in FIG. 3 may actually be a procedural element within a higher level control recipe.

It should be understood that the references to a procedural element and a sub-procedural element as used herein are meant only to demonstrate the relationship between procedural elements in different levels of the hierarchy of the overall batch process should not be construed so as to limit the claims below. For example, a procedural element in one level of the hierarchy (e.g., unit procedure) may be considered a sub-procedural element in relation to another level of the hierarchy (e.g. procedure). Conversely, a sub-procedural element in one level of the hierarchy (e.g., operation) may be considered a procedural element in relation to another level of the hierarchy (e.g., phase). As such, any one of the procedural elements or sub-procedural elements may each themselves relation to a control recipe at different levels of hierarchy of the overall batch process control. Further, while the control recipe execution 300 has been shown to include a variety of decisions 304, 310, 316, it should be understood that execution of a control recipe may include a series of procedural elements executed in a pre-configured order, each one of which is executed during execution of the control recipe.

Figure 4:
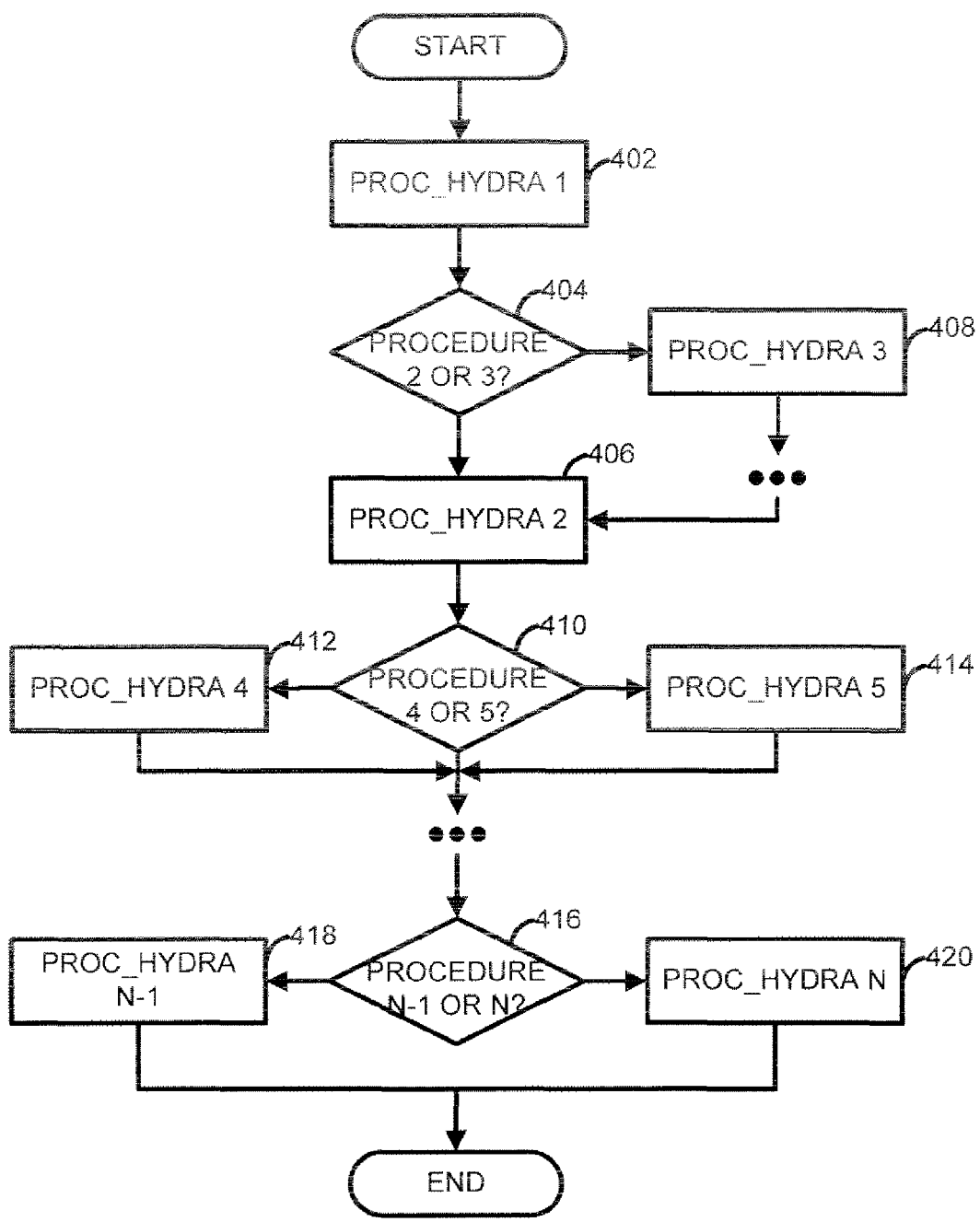
FIG. 4 is a flowchart of an example of an execution of a control recipe using instantiation objects to instantiate various procedural elements in a batch execution environment.

FIG. 4 is an example of a control recipe structure implementing one or more instantiation objects or processes in order to instantiate each procedural element during execution of the control recipe. In particular, using a control process execution object or process, the batch execution engine 30 may load the control recipe structure at batch creation and load the instantiation objects when the control recipe is instantiated or otherwise loaded. As compared with typical control recipe executions that load the entire control recipe structure including all procedural elements, structure, recipe parameters, equipment, etc. that may be used to run the batch, the instantiation objects are used to instantiate each procedural element as the procedural element is utilized by the control recipe. Again, the choice as to whether a particular procedural element may actually be executed during execution of the control process may not be known at creation time (e.g. when the control recipe is loaded for execution), and is not known until runtime (e.g. execution of the control recipe). After the procedural element is executed, the instantiation object unloads the procedural element from the control recipe, and the control recipe continues execution. In other words, the various procedural elements of the control recipe are loaded "just-in-time" and only when required rather than at creation time. By using the instantiation objects to instantiate each procedural element as a procedural element is utilized by the control recipe, each procedural element generally only utilizes the resources of the process control system 52 (e.g. memory, processor, software, etc.) for the duration of the procedural element's execution. Further, by only instantiating the procedural elements at the time they are needed rather than at creation time, only those procedural elements that are actually used during execution of the control recipe end up utilizing the resources of the process system 52. As a result, performance of the batch execution engine 30, and the process system 52 in general, may realize increased efficiency in the utilization of resources (e.g. processor utilization, memory resource usage, etc.).

Referring to FIG. 4, the logical structure of the control recipe is shown in relation to multiple instantiation objects, also referred to as procedural hydrators (e.g., Proc_Hydra 1-N). As illustrated, the logical structure of the control recipe is similar to the structure shown in FIG. 3, with a logical predetermined order in implementing various procedural elements and any "OR" decision points. However, rather than loading the entire control recipe at batch creation time, including all procedural elements that may be invoked during the execution of the control recipe, the logical structure of the control recipe is loaded into the batch execution engine 30 without the procedural elements. In one example, the logical structure of the control recipe may refer to the logical flow of the control recipe, "OR" decision points, and markers or calls associated with each possible procedural element that may be called upon during execution of the control recipe.

Also at batch creation time, each of the instantiation objects may be loaded into the batch execution engine 30. As shown in FIG. 4, and as compared with FIG. 3, an instantiation object is associated with each of the procedural elements that may be executed during execution of the control recipe. In one example, each of the instantiation objects may be implemented in the logical structure of the control recipe. On the other hand, calls or markers within the logical structure of the control recipe may be used to call each instantiation object as it is needed to instantiate a procedural element.

During batch runtime and execution of the control recipe, each procedural element is instantiated, executed and deconstructed within the execution duration of the procedural element, so that each procedural element uses resources only for the time that it is needed. For instance, during runtime of a batch process, the batch execution engine 30 begins the control recipe of FIG. 4 by using the instantiation object Proc_Hydra 1 at block 402 to instantiate Procedural element 1 shown in FIG. 3. Once Procedural element 1 has been executed, the batch execution engine 30 uses the instantiation object Proc_Hydra 1 to deconstruct Procedural element 1, whereby all resources that were allocated to Procedural element 1 during its execution are de-allocated and returned (or freed) to the batch execution engine 30. Thereafter, execution of the control recipe reaches the decision point 404, which presents a decision of proceeding with Procedure 2 or Procedure 3, the choice of which may be dependent on the execution of the previous Procedure 1. If Procedure 3 is chosen based on the logic of the control recipe, the instantiation object Proc_Hydra 3 is used to instantiate Procedure 3, whereas if Procedure 2 is chosen, the instantiation object Proc_Hydra 2 is used to instantiate Procedure 2. Accordingly, execution of the control recipe replaces each procedural element 302, 306, 308, 312, 314, 318, 320 that may be called during execution with instantiation objects, or calls to instantiation objects, 402, 408, 406, 412, 414, 418, 420, respectively.

Instantiation objects may be used in a similar manner for any sub-procedural elements that are called upon during a procedural element. For example in executing Procedure 2, the logical structure of the procedural element may include instantiation objects, or calls to instantiation objects. If a sub-procedural element (e.g., unit procedure, operation, phase, etc.) is needed during execution of the procedural element (e.g., Procedure 2), an instantiation object is used to instantiate an associated sub-procedural element, where the sub-procedural element is executed during the runtime of the procedural element and deconstructed when the sub-procedural element is completed. The procedural element may continue as needed, or may finish and be deconstructed by the instantiation object associated with the procedural element, whereby the control recipe continues execution as needed. As such, it can be seen that the instantiation objects are equally applicable to various hierarchical levels within a control recipe.

Figure 5:
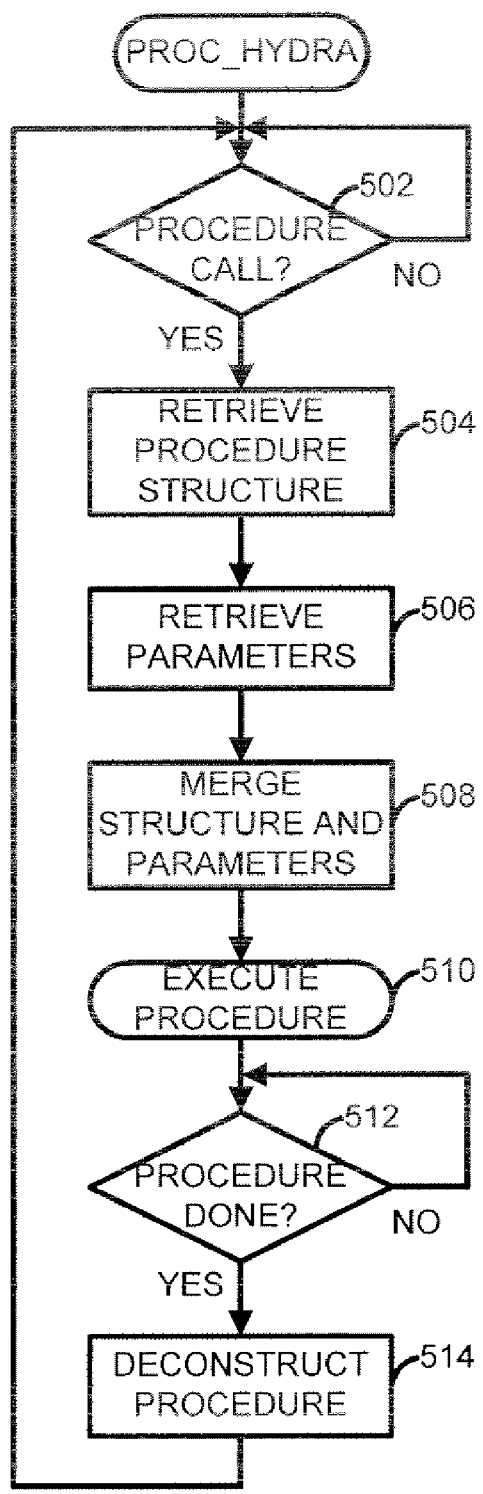
FIG. 5 is a flowchart of an example of an instantiation object instantiating a procedural element, a procedural element being executed and the instantiation object the procedural element.

FIG. 5 is an example of a process used by an instantiation object to instantiate and deconstruct a procedural element for use by the control recipe. An instantiation object may include the logical structure of the procedural element for which it is associated, and which may be loaded into the instantiation object at creation time. Alternatively, an instantiation object may include a logic module or routine that understands how the logical structure of the procedural element is implemented and constructs the logical structure of the procedural element when the procedural element is instantiated.

Each instantiation object may further include a logic module or routine that understands how to implement parameters within the logical structure of the procedural element. In particular, an instantiation object understands how to create the procedural element with different parameters, where the parameters may include logical arguments such as runtime attributes or logical arguments developed during execution of the control recipe, process control variables, process control data, device utilization, etc. For example, an instantiation object for Procedure 2 at block 402 may understand how to utilize measurement data developed from Procedure 1 as it was executed by the control recipe (e.g., amount of product used to fill the reactor 100). The instantiation object for Procedure 2 may further understand how to utilize device information regarding the reactor 100 (e.g., fill status, pressure) in instantiating Procedure 2 (e.g., travel and speed for opening the valve 103). Still further, the instantiation object may account for parameters of the devices used in Procedure 2 (e.g., valve diagnostic information). An instantiation object is thereby capable of constructing and populating the logical structure of an associated procedural element with the parameters that will be used by the procedural element during execution.

Referring to FIG. 5, an instantiation object (Proc_Hydra) may wait to be invoked or called by the control recipe or batch execution engine 30 at block 502. For example, the instantiation object may be invoked or called based on a call for a procedural element associated with the instantiation object, invoked based on its inclusion in the logical structure of the control recipe or called based on the inclusion of a marker or call for the instantiation object in the logical structure of the control recipe.

When the instantiation object is called or invoked at block 502, the instantiation object instantiated by or within the associated procedural element. As indicated above, each instantiation object may be loaded to the batch execution engine 30 with the logical structure of the associated procedural element loaded in the instantiation object. On the other hand, at block 504, the instantiation object may construct the logical structure of the procedural element, which includes accounting for any sub-procedural elements, using the logic module or routine referenced above. Once the logical structure of the procedural element has been constructed or otherwise retrieved, the instantiation object retrieves parameters for the procedural element at block 506, which may include, or be based upon, parameters that have been developed during the runtime of the control recipe, including parameters that have been developed by, or based upon, previously executed procedural elements. As indicated above, the parameters may include, but are not limited to, equipment to be used, process control data, process control variables, logical arguments or attributes, etc.

At block 508, the instantiation object merges the logical structure of the procedural element with the parameters retrieved at block 506 to finish instantiating the procedural element. The logic of the instantiation object is provided to merge the parameters and logical structure as needed by the procedural element for execution, and which may be guided by the batch execution engine 30. Thereafter, the procedural element is loaded into batch execution engine 30 for execution within the control recipe at block 510.

At block 512, the instantiation object waits for the procedural element to finishing executing. When the procedural element has been executed, which may be indicated by the instantiation object being invoked or called, the instantiation object is used to deconstruct the procedural element at block 514. In particular, the instantiation object may unload the procedural element from the batch execution engine 30, thereby freeing up the batch execution engine resources, and removing parameters from the logical structure of the procedural element. The instantiation object may maintain the logical structure of the procedural element or disassemble the logical stricture. Thereafter, the instantiation object returns control to block 502 to be invoked or called again as needed during execution of the control recipe.

Figure 6:
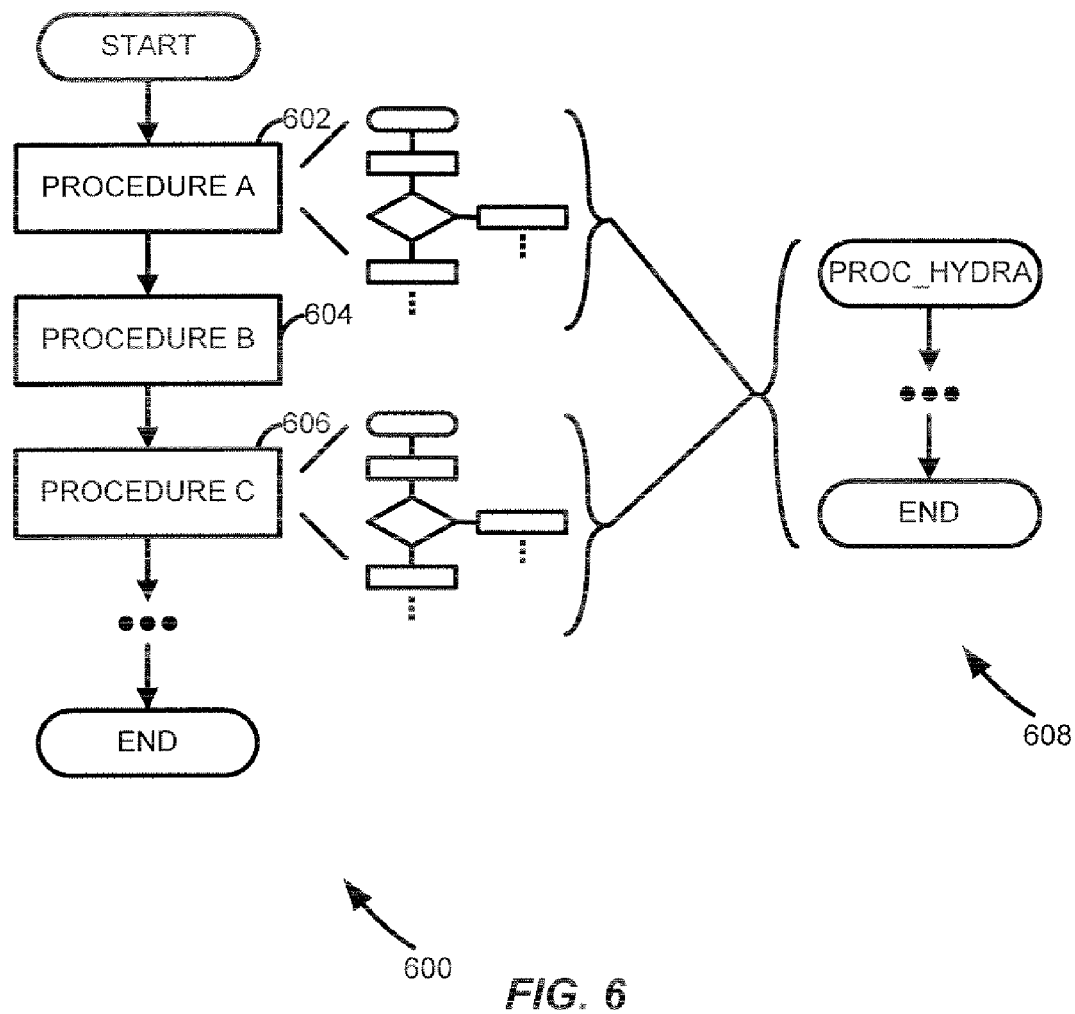
FIG. 6 is a flowchart of an example of an execution of a control recipe using the same instantiation object to instantiate multiple procedural elements in a batch execution environment.

FIG. 6 illustrates a further aspect of the instantiation objects that may be used in the above implementation of a control recipe in the batch execution environment. In particular, many procedural elements used in execution of a control recipe utilize the same logical stricture, or the difference between the procedural elements lies only in the parameters utilized therein. Over the course of executing a control recipe, the same logical structure is essentially utilized over and over. However, is understood from the above, the parameters utilized by a procedural element may not be known until runtime (i.e. during execution of the control recipe).

For example, again referring to FIG. 3, the difference between Procedure 4 and Procedure 5 may be that Procedure 4 runs on reactor 100, where as Procedure 5 runs on reactor 200. The logical structure for Procedure 4 and Procedure 5 is otherwise the same; only the equipment and the parameters associated therewith is different. As another example, where Procedure 1 involves a reaction process using the reactor 100 and the decision at decision point 304 may determine whether the reaction process needs to be run again using Procedure 3 or the batch process continued using Procedure 2. Because Procedure 3 is essentially a re-execution of Procedure 1, but with possibly different parameters (e.g., different reaction times), Procedure 3 may have the same logical structure as Procedure 1.

Referring back to FIG. 6, execution of a control recipe generally designated 600 is shown as including a variety of procedural elements 602, 604, 606 (Procedures A-C). Of course, it should be understood that the control recipe may be much more complex than that shown in FIG. 6, including article structure of various procedural elements and sub-procedural elements etc. Each of Procedures A and C 602, 606 is shown to include the same logical structure. Accordingly, the same instantiation object, generally designated 608, may be used for both of Procedural elements A and C. That is, the same the instantiation object 608 may utilize the same logical structure in instantiating each of Procedural elements A and C, and merging the logical structure with the parameters unique to Procedural elements A and C, as needed.

As a result, while execution of the control recipe utilizes two different procedural elements, only one instantiation object is needed for both procedural elements. In turn, only one instantiation objects is loaded into the batch execution engine 30 at creation time, and the instantiation object need only maintain a one logical structure for both procedural elements, or otherwise need only maintain logic for constructing one logical structure for both procedural elements.

Comparison testing has shown that the above approach for implementing a control recipe may markedly improve memory usage or consumption by as much as 93%, depending on the complexity of the control recipe. As a result, many more batches may be run simultaneously due to the increase in available resources. Although there is some time involved in instantiating each procedural element as it is needed, even the largest and complex control recipes involved an increase of only a few seconds to instantiate a procedural element.

While the above batch execution techniques have been described with reference to an improved method and system for implementing a control recipe, the running of control recipes in a process control system relies on equipment models which describes the physical equipment of the plant (e.g., tanks, valves, pumps, etc.) to the execution environment. In general, procedural elements are implemented as computer program that are executed by and within data-processing devices, including personal computers, workstations 14, and controllers 12. Execution of a procedural element results in an output from the data-processing device that can be used to control a physical element, such as equipment. A procedural element performs its assigned task by invoking "basic control" with respect to at least one physical element. This type of control is dedicated to establishing and maintaining a specific desired state of the physical element. Basic control would, for example, start or maintain a flow of material in a storage element or heating of starting materials in a polyvinyl chloride reactor element.

The lower levels of the procedural model (namely phases) perform the actual communications with the actual physical elements thereby invoking or performing basic control. The higher levels of the procedural model are provided as abstractions to improve organization and structure of the procedural model, and the physical model as well. An execution object or process runs on the data processing device that executes procedural elements (e.g., the batch execution engine). The object or process coordinates execution of procedural elements in accordance with one or more models. Procedures, corresponding unit procedures, corresponding operations, and corresponding phases are sequenced through their respective steps by the object or process. When a phase is instantiated, the phase communicates the instantiation request to the phase logic interface within the associated controller 12. The programmable controller 12 then executes the actual state logic for the phase and provides the required process control through communications to the process equipment.

Figure 7:
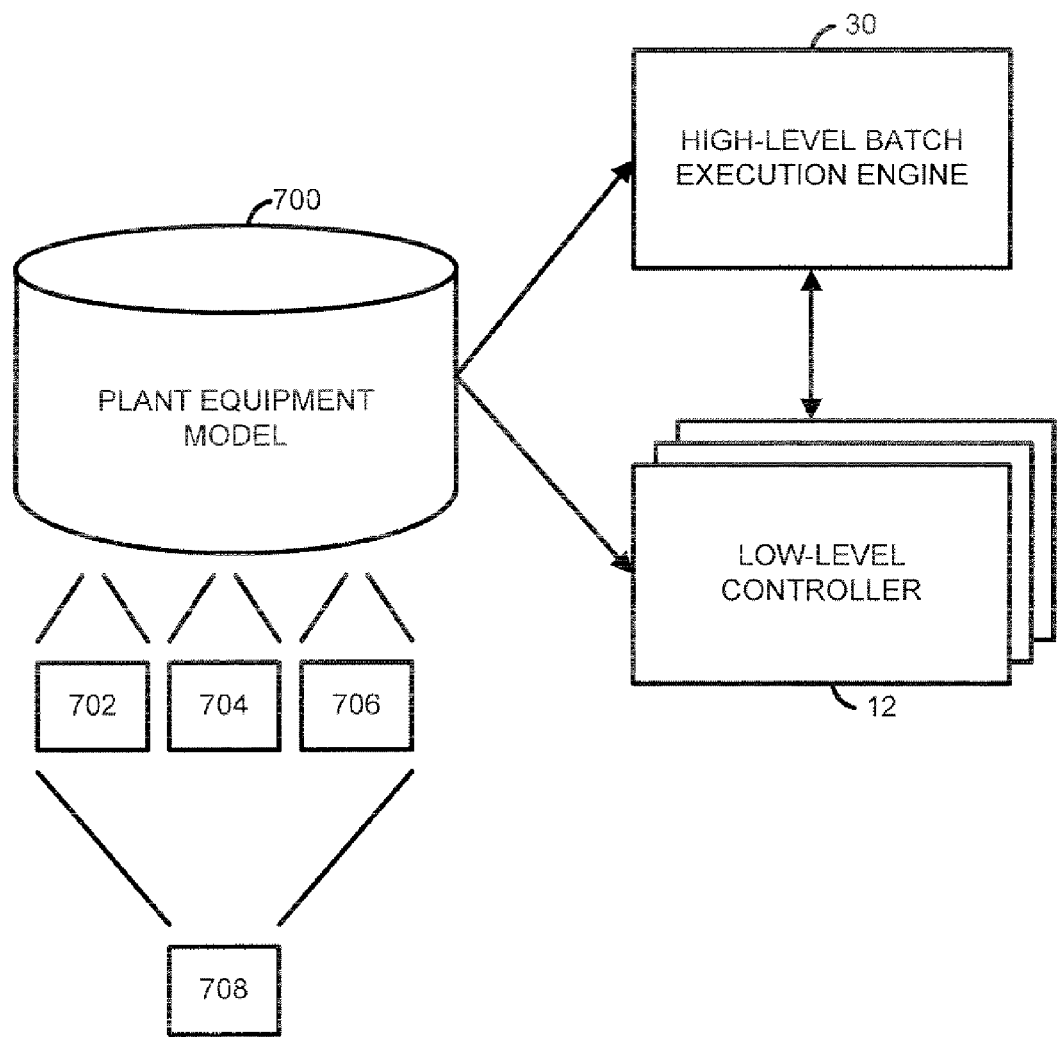
FIG. 7 is a partial block diagram, partial schematic diagram of an example of a portion of a process plant depicting the relationship of a higher-level batch execution engine and a lower-level controller and the models used therein.

FIG. 7 illustrates an example of a logical relationship between the batch execution engine 30, the controllers 12 within a batch execution environment and the equipment models 700 provided thereto. The equipment model 700 is broken down into equipment modules and into control modules 702, 704, 706, like those specified in the S-88 standard, such that modular blocks are created that each represent a logical set of control actions. For example, a reactor, and associated filters and dryers, might be broken down into three or four control modules, each used to manipulate and coordinate various valves 103 and pumps to move product from one reactor to another, or one area to another, without improperly mixing unwanted supply materials. These control modules are themselves typically grouped together to make what is termed a "phase logic module" 708.

The phase logic module 708 is itself an entity which might be used to perform a specific task, for example "mix", "transfer", or "heat". Usually these phases 708 are assigned and executed in the controller 12 residing in the distributed batch control system. Concurrently, the plant equipment model 700 is also assigned and loaded into the "higher level" batch execution engine 30 which is responsible for coordinating the various phases 708 running in the controllers 12 into the higher-level control recipes, each leading to a finished product.

Because of this logical relationship between the controllers 12 and the batch execution engine 30, the two copies of the equipment model 700 between the lower-level controller 12 and the higher-level batch execution engine 30 should be kept consistent in order for the execution of a control recipe to complete successfully. Nonetheless, oversight or necessity may lead to an inconsistency manifesting between the equipment model known by one or more of the controllers 12 and the batch execution engine 12. When this occurs, rather than aborting the batch outright if an inconsistency occurs, the resolution techniques described below may be used to reconcile the situation. Using the techniques below, lost production time is reduced and, in the worst case, loss of product due to time constraints placed on the physical process being performed is reduced.

Figure 8:
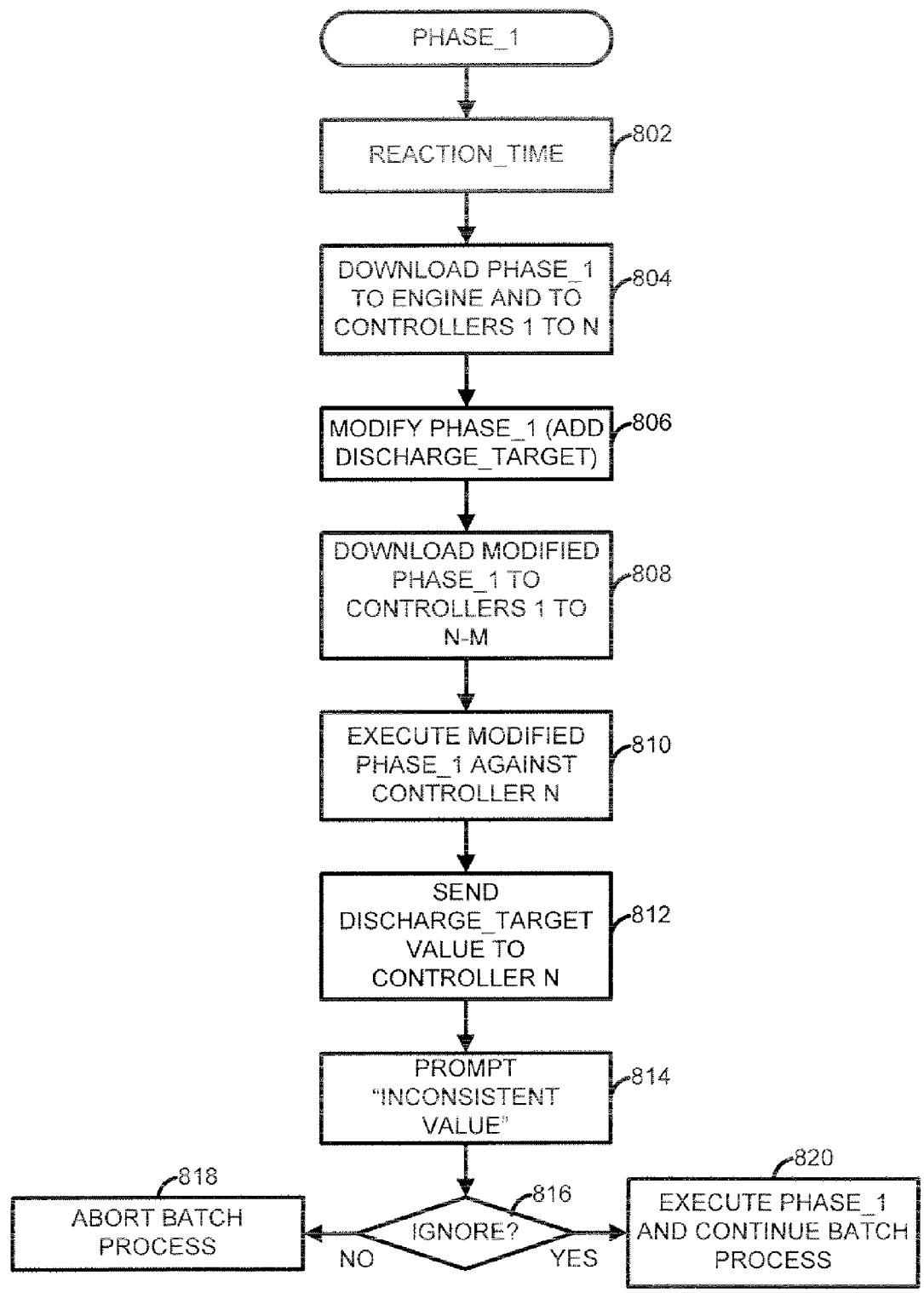
FIG. 8 is a flowchart of an example of a procedure for resolving inconsistencies between the model of a higher-level batch execution engine and the model of a lower-level controller.

FIG. 8 illustrates an example of a technique for resolving inconsistencies between models maintained by the controller(s) 12 and the batch execution engine 30. In particular, the technique provides a manner in which an inconsistency may be detected and provides the batch execution engine 30 or the plant personnel with the ability to decide whether to resolve or ignore the discrepancy at runtime. In one example, the technique for resolving inconsistencies may be performed as part of the execution of a procedural element, as discussed above. This option allows both old and new versions of the models, or parameters thereof, to coexist simultaneously, while providing flexibility in deciding how and when to implement plant equipment model changes.

Referring to FIG. 8, the example assumes a phrase is used in the process plant, referred to as Phase_1, and Phase_$_1$ has a single input parameter, Reaction_Time indicated at block 802, which is used by its phase logic to determine how long the phase should run the reactor 100. However, it should be understood that the technique shown in FIG. 8 may be equally applicable to any discrepancy between the models, including different model versions, models for different equipment (e.g., different reactors), or any other model parameter. Further, while the models are provided with reference to equipment or devices within the process plant, it should be understood that the models may refer to any entity within the process plant, including the models of loops, units, areas and the entire process plant itself.

At some point the phase, which is part of the overall plant equipment model, is downloaded to both the controller 12 and the batch execution engine 30 as indicated at block 804, and is utilized as needed. In this example, the Reaction_Time parameter may be initialized by the batch execution engine 30 at runtime, which may be based on an operator input selection, and then sent to the controllers 12 just before Phase_1 is started.

In this example, it is further assumed that a discrepancy is introduced between at the model maintained is at least one of the controllers 12 and the model maintained by the batch execution engine 30. For example, a plant personnel may need to make a modification to Phase_1, such that it has 2 input parameters instead of 1. For example, the plant personnel may add a second parameter discharge_Target, used to determine where the product should be sent after Phase_1 completes. In order to use this new version of the phase, the changes should be downloaded to any controllers 12 which may need to run its logic as indicated at block 808, as well as sending the new information to the batch execution engine 30.

However, it is possible, and even likely, that the change can be safely updated to some controllers 1 through N-M, but not to other controllers (N), which may be based on the state of various batches using the controllers. For example, a batch that is using controller N may prevent the controller from updating the model. If the batch execution engine 30 is running a batch against the controller N which, at that point in time, does not have a model, or more particularly a phase, that has been updated with the second parameter, Discharge_Target.

When the batch execution engine 30 receives an input to execute the batch against the controller N, (e.g., execute the process associated with controller N) as indicated at block 810, the batch execution engine 30 sends a value for Discharge_Target to the controller as indicated at block 812. However, the older version of Phase_1 maintained by the controller 12 will not know anything about the new Discharge_Target parameter.

However, in actuality, the discrepancy may be totally benign. For example, it is possible Phase_1 has been running without incident in its old configuration for a significant duration (e.g., weeks), because in the old configuration the Discharge_Target was "hardcoded" into the phase logic itself. In this case, the hardcoded value is sufficient and Phase_1 may be executed by the controller. On the other hand, it is also possible that the inconsistency is an oversight (i.e., the new configuration was not downloaded to the controller and the controller has no value for Discharge_Target), in which case the missing parameter cannot be ignored. The inconsistency may be reported by the controller 12 at block 814 to the batch execution engine 30, for example by a handshake signal upon receiving the value indicating the value or parameter is unknown, and the batch execution engine 30 may provide a message regarding the inconsistency to a workstation 14 for an operator to handle the inconsistency. In this case, an operator may include a workstation user or a diagnostic and maintenance routine utilized by the workstation 14. Alternatively, the batch execution engine 30 may handle the inconsistency, with or without reporting to the workstation 30.

In particular, instead of automatically aborting the batch process, an option is provided at block 816 to abort (hold) the batch process at block 818 or to continue by executing Phase_1 and continuing the batch process at block 820. The decision may be left to a workstation user, to a diagnostic and maintenance routine utilized by the workstation 14 or by the batch execution engine 30. For example, the prompt may be displayed to a workstation user (e.g., a plant operator) at the workstation 14, or otherwise provided to the workstation 14 or batch execution engine 30. The prompt may include information regarding the inconsistency, including location (e.g., controller), the model involved, model version, the model parameter involved (e.g., Phase_1, Discharge_Target), or any other information regarding the difference between the model of the controller 12 and the model of the batch execution engine 30 which is a cause of the inconsistency. The prompt may further include addition information in evaluating the seriousness of the inconsistency, by searching for a replacement value that may be used (e.g., a hardcoded value), or determining if the inconsistency was an oversight.

The logic for providing the information in the prompt may be provided by various aspects of the process system, including the controller 12, the batch execution engine 30 and the workstation 14. For example, the controller 12 and batch execution engine 30 may each provide its version of the model and associated parameters, identification of offending parameters, values previously used for an offending, parameter, date/time of previous updates, etc., and any one of the controller 12, batch execution engine 30 and workstation 14 may use the information to determine the source of the inconsistency and its effect on the batch process. Of course, this information could also be displayed to a user for a user-invoked decision.

If the decision at block 816 is to abort (hold) the batch process, the inconsistency may be resolved by uploading the correct model or model update to the controller 12. If the decision at block 816 is to continue with the batch process, the controller may be provided with alternative information to use, such as an instruction to use the older version of the model or phase. For example, the controller 12 may be provided with a previous value of "Discharge_Target" that was used without incident in a previous batch run, which may be provided by the hardcoded value, from the data historian 19, etc. The controller 12 is then able to execute Phase_1 and the batch process is allowed to continue. Other examples of parameters that the controller 12 or batch execution engine 30 may use include defaults values (e.g., manufacturer default value or batch process defaults), user inputted values, etc. If multiple controllers in the process use the same model or model parameter, but only one controller provides the inconsistency, the batch execution engine 30 may provide a global parameter to be used by all controllers 12 and which is compatible with all versions of the model.

Although the forgoing a text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A system for implementing a control process within a process control system, wherein the control process comprises a control process structure and execution of the control process comprises execution of a plurality of procedural elements, the system comprising:
a processing unit;
a computer readable storage memory coupled to the processing unit;
a plurality of instantiation objects stored in the computer readable storage memory, wherein each procedural element of the control process is associated with one of the instantiation objects; and
a control process execution object stored in the computer readable storage memory and adapted to be executed on the processing unit to load the control process structure into a control process execution engine, load each of the plurality of instantiation objects into the control process execution engine when the control process is instantiated, use each instantiation object to instantiate a procedural element associated with the instantiation object as the control process structure calls for the procedural element during execution of the control process, execute the instantiated procedural element as part of the control process, and use the instantiation object to deconstruct the instantiated procedural element as execution of the procedural element is completed during execution of the control process.

2. The system of claim 1, wherein the control process execution object is adapted to be executed on the processing unit to load a logical structure of each procedural element into the associated instantiation object when the control process is instantiated.

3. The system of claim 1, wherein each of the plurality of instantiation objects is adapted to be executed on the processing unit to instantiate a procedural element associated with the instantiation object by creating a logical structure of the procedural element, populating the logical structure with control process parameters to create the associated procedural element and loading the populated logical structure into the control process structure.

4. The system of claim 3, wherein each of the plurality of instantiation objects is adapted to be executed on the processing unit to populate the logical structure of the associated procedural element with control process parameters using control process parameters generated during execution of the control process.

5. The system of claim 4, wherein each of the plurality of instantiation objects is adapted to be executed on the processing unit to populate the logical structure of the associated procedural element with control process parameters using control process parameters generated based on an execution of a previous procedural element in the control process.

6. The system of claim 3, wherein each of the plurality of instantiation objects is adapted to be executed on the processing unit to populate the logical structure of the associated procedural element with control process parameters using one or more control process parameters selected from the group consisting of: logical arguments, process control variables, process control data and utilization of a device within the process control system.

7. The system of claim 1, wherein each of the plurality of instantiation objects is adapted to be executed on the processing unit to deconstruct a procedural element associated with the instantiation object by unloading the procedural element from the control process structure, removing process parameters from the logical structure of the procedural element and deconstructing the logical structure of the procedural element.

8. The system of claim 1, wherein the control process structure comprises a plurality of choices between two or more procedural elements, and execution of the control process comprises a decision between the two or more procedural elements of each choice, and wherein the instantiation object is adapted to instantiate only one of the two or more procedural elements.

9. The system of claim 8, wherein the instantiation object is adapted to be executed on the processing unit to instantiate only one of the two or more procedural elements based on an execution of a previous procedural element in the control process.

10. The system of claim 1, wherein the control process structure comprises the plurality of instantiation objects.

11. The system of claim 1, wherein two or more of the plurality of procedural elements comprise the same logical structure, and wherein each of the procedural elements having the same logical structure are associated with the same instantiation object.

12. The system of claim 1, wherein:
execution of the instantiated procedural element comprises execution of a sub-procedural element,
the sub-procedural element is associated with an instantiation object comprising a logic structure of the sub-procedural element, and
the control process execution object is adapted to be executed on the processing unit to load instantiation object associated with the sub-procedural element into the control process execution engine when the procedural element is instantiated, use the instantiation object associated with the sub-procedural element to instantiate the sub-procedural element as the instantiated procedural element calls for the sub-procedural element during execution of the instantiated procedural element, execute the instantiated sub-procedural element as part of the instantiated procedural element, and use the instantiation object associated with the sub-procedural element to deconstruct the instantiated sub-procedural element as execution of the sub-procedural element is completed during execution of the instantiated procedural element.

13. The system of claim 1, wherein the control process comprises a control recipe for a batch process.

14. A method of implementing a control process within a process control system, wherein the control process comprises a control process structure having calls for a plurality of procedural elements during execution of the control process, the method comprising:
establishing an instantiation object for each one of the procedural elements;
constructing a procedural element within the associated instantiation object as the procedural element is called for by the control process during execution of the control process;
executing the procedural element as part of the control process; and
deconstructing the procedural element within the instantiation object once the procedural element has been executed as part of the control process, wherein deconstructing the procedural element is performed during execution of the control process.

15. The method of claim 14, wherein establishing an instantiation object for each one of the procedural elements comprises implementing the instantiation object in the control process structure as the calls for the plurality of procedural elements.

16. The method of claim 14, wherein constructing the procedural element within the associated instantiation object comprises allocating resources to the procedural element for execution as part of the control process, and wherein deconstructing the procedural element within the instantiation object comprises releasing the resources allocated to the procedural element.

17. The method of claim 14, wherein constructing the procedural element within the associated instantiation object comprises:
merging a logical structure of the procedural element with one or more control process parameters; and
loading the merged logical structure of the procedural element and the one or more control process parameters into the control process structure.

18. The method of claim 17, wherein constructing the procedural element within the associated instantiation object further comprises constructing the logical structure of the procedural element.

19. The method of claim 17, wherein merging a logical structure of the procedural element with one or more control process parameters comprises merging a logical structure of the procedural element with one or more control process parameters generated during execution of the control process.

20. The method of claim 19, wherein merging a logical structure of the procedural element with one or more control process parameters comprises merging a logical structure of the procedural element with one or more control process parameters derived from a previous procedural element executed in the control process.

21. The method of claim 14, further comprising:
instantiating the control process; and
loading the logical structure of each procedural element into the associated instantiation object when the control process is instantiated.

22. The method of claim 14, wherein each procedural element comprises a logical structure, and wherein establishing an instantiation object for each one of the procedural elements comprises establishing an instantiation object for a plurality of procedural elements having the same logical structure.

23. The method of claim 14, wherein the instantiated procedural element comprises a logical structure having calls for a sub-procedural element during execution of the instantiated procedural element, the method further comprising:
establishing an instantiation object for the sub-procedural element;
constructing the sub-procedural element within the associated instantiation object as a sub-procedural element is called for by the instantiated procedural element during execution of the instantiated procedural element;
executing the sub-procedural element as part of the instantiated procedural element; and
deconstructing the sub-procedural element within the instantiation object once the sub-procedural element has been executed as part of the instantiated procedural element, wherein deconstructing the sub-procedural element is performed during execution of the instantiated procedural element.

24. A method of implementing a control recipe for a batch process in a process control system, wherein the control recipe comprises a control recipe structure having calls for a plurality of procedural elements during execution of the control recipe, the method comprising:
- establishing an instantiation object for each one of the procedural elements;
- executing the control recipe based on a first version of a process control model to generate control parameters;
- constructing a procedural element from the associated instantiation object as the procedural element is called for by the control recipe during execution of the control recipe;
- executing the procedural element as part of the control recipe, wherein executing the procedural element comprises transmitting a control parameter to a controller in the batch process and executing a control function using the control parameter with a second version of the process control model and requesting an operation instruction regarding continued operation of the control recipe based on the ability of the second version of the process control model to use the control parameter, wherein the second version of the process control model generates an error if the parameter is not usable with the second version of the process control model;
- continuing execution of the batch process if the operation instruction comprises a continue execution instruction, wherein continuing execution of the batch process comprises deconstructing the procedural element once the procedural element has been executed as part of the control recipe, and wherein deconstructing the procedural element is performed during execution of the control recipe; and
- aborting execution of the batch process if the operation instruction comprises an abort execution instruction.

25. A system for implementing a control recipe for a batch process in a process control system, wherein the control recipe comprises a control recipe structure and execution of the control recipe comprises execution of a plurality of procedural elements, the system comprising:
- a process controller having a first model of an entity of the process control system;
- a plurality of instantiation objects, wherein each procedural element of the control recipe is associated with one of the instantiation objects; and
- a batch process execution engine having a second model of the entity of the process control system, wherein the batch process execution engine is adapted to provide a control instruction to the process controller based on the second model of the entity, and wherein the process controller is adapted to execute the control instruction based on the first model of the entity;
- a batch process execution object that loads the control process structure into the batch process execution engine, loads each of the plurality of instantiation objects into the batch process execution engine when the control process is instantiated, uses each instantiation object to instantiate a procedural element associated with the instantiation object as the control recipe structure calls for the procedural element during execution of the control recipe, executes the instantiated procedural element as part of the control recipe, that detects a difference between the first and second models of the entity during execution of the instantiated procedural element in the control recipe and generates a prompt in response detection of the difference, receives an operation instruction regarding continued operation of the batch process, wherein the operation instruction comprises one of continuing execution of the batch process or aborting execution of the control process, uses the instantiation object to deconstruct the instantiated procedural element as execution of the procedural element is completed during execution of the control recipe if the operation instruction comprises a continue execution instruction, and aborts execution of the batch process if the operation instruction comprises an abort execution instruction.

* * * * *

UNITED STATES PATENT AND TRADEMARK OFFICE
CERTIFICATE OF CORRECTION

PATENT NO. : 8,046,086 B2
APPLICATION NO. : 11/748840
DATED : October 25, 2011
INVENTOR(S) : Pettus et al.

It is certified that error appears in the above-identified patent and that said Letters Patent is hereby corrected as shown below:

In the Specification

Column 1, line 30, "preform" should be -- perform --.

Column 4, line 13, "have" should be -- has --.

Column 4, line 14, "complex further" should be -- complex and further --.

Column 4, line 56, "are" should be -- is --.

Column 4, line 64, "are" should be -- is --.

Column 7, line 55, "derailed" should be -- detailed --.

Column 8, line 12, "in formation" should be -- information --.

Column 8, line 52, "temperature sensors" should be -- temperature sensor, --.

Column 8, line 52, "pressure sensors" should be -- pressure sensor, --.

Column 9, line 62, "are" should be -- is --.

Signed and Sealed this
Twelfth Day of November, 2013

Teresa Stanek Rea
*Deputy Director of the United States Patent and Trademark Office*